(12) United States Patent
Zhou et al.

(10) Patent No.: US 10,082,867 B2
(45) Date of Patent: Sep. 25, 2018

(54) DISPLAY CONTROL METHOD AND DISPLAY CONTROL APPARATUS

(71) Applicant: Beijing Zhigu Rui Tuo Tech Co., Ltd, Beijing (CN)

(72) Inventors: Liang Zhou, Beijing (CN); Hanning Zhou, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 1 day.

(21) Appl. No.: 15/123,622

(22) PCT Filed: Dec. 29, 2014

(86) PCT No.: PCT/CN2014/095259
§ 371 (c)(1),
(2) Date: Sep. 2, 2016

(87) PCT Pub. No.: WO2015/149554
PCT Pub. Date: Oct. 8, 2015

(65) Prior Publication Data
US 2017/0075418 A1    Mar. 16, 2017

(30) Foreign Application Priority Data

Apr. 2, 2014 (CN) .......................... 2014 1 0131234

(51) Int. Cl.
*G06F 3/01* (2006.01)
*G09G 5/00* (2006.01)

(52) U.S. Cl.
CPC .............. *G06F 3/013* (2013.01); *G09G 5/003* (2013.01); *G09G 2320/02* (2013.01); *G09G 2354/00* (2013.01)

(58) Field of Classification Search
CPC ........... G06F 3/013; G06F 3/14; G09G 5/003; G09G 5/38; G09G 2320/02;
(Continued)

(56) References Cited

U.S. PATENT DOCUMENTS 7,495,638 B2    2/2009  Lamvik et al.
9,375,639 B2    6/2016  Kobayashi et al.
(Continued)

FOREIGN PATENT DOCUMENTS

CN      1815437 A       8/2006
CN    103309034 A       9/2013
(Continued)

OTHER PUBLICATIONS

International Search Report for PCT Application No. PCT/CN2014/095259, dated Apr. 3, 2015, 3 pages.

*Primary Examiner* — Stephen G Sherman
(74) *Attorney, Agent, or Firm* — Amin, Turocy & Watson, LLP

(57) ABSTRACT

Display control is provided relating to the field of near-to-eye display technologies. A method comprises: determining a first display area, in the field of view (FOV) of a user, of an image displayed on a main display device; dividing the image according to display capabilities of the main display device and a near-to-eye display device, the first display area, and an attribute of the image; controlling a display of the near-to-eye display device in accordance with a result of the division of the image. The near-to-eye display device is used to supplement a display that is provided at a suitable viewing distance of a user by a device but cannot fully fill the FOV of the user, so that an image can be displayed by making adaptations to meet the original quality of the image as far as possible, thereby providing a good viewing experience.

20 Claims, 4 Drawing Sheets

(58) Field of Classification Search
CPC ......... G09G 2354/00; G09G 2320/068; G09G 2340/04; G06T 11/60; G02B 27/0172; G02B 27/017; G02B 2027/0123; G02B 2027/014; G02B 2027/0147
USPC .......................................................... 345/8
See application file for complete search history.

(56) References Cited

U.S. PATENT DOCUMENTS

| | | | | |
|---|---|---|---|---|
| 2002/0167531 | A1* | 11/2002 | Baudisch | G06F 3/1438 345/611 |
| 2008/0225132 | A1 | 9/2008 | Inaguma | |
| 2012/0127284 | A1* | 5/2012 | Bar-Zeev | G02B 27/017 348/53 |
| 2013/0214998 | A1 | 8/2013 | Andes et al. | |
| 2013/0234914 | A1 | 9/2013 | Fujimaki | |
| 2014/0002629 | A1 | 1/2014 | Ratcliff et al. | |
| 2014/0078720 | A1* | 3/2014 | An | G02F 1/133603 362/97.1 |

FOREIGN PATENT DOCUMENTS

| | | |
|---|---|---|
| CN | 103516887 A | 1/2014 |
| CN | 103927005 A | 7/2014 |
| CN | 104049363 A | 9/2014 |

* cited by examiner

DISPLAY CONTROL METHOD AND DISPLAY CONTROL APPARATUS

RELATED APPLICATION

The present application is a U.S. National Stage filing under 35 U.S.C. § 371 of international patent cooperation treaty (PCT) application No. PCT/CN2014/095259, filed Dec. 29, 2014, and entitled "DISPLAY CONTROL METHOD AND DISPLAY CONTROL APPARATUS", which claims the priority to Chinese Patent Application No. 201410131234.X, filed on Apr. 2, 2014, which applications are hereby incorporated into the present application herein by reference in their respective entireties.

TECHNICAL FIELD

The present application relates to the field of near-to-eye displaying, and in particular, to a display control method and a display control apparatus.

BACKGROUND

With the rapid popularization and a continuous increase in the network connection speed, mobile computing capability, and display quality, portable devices (mobile phones, tablet computers, and so on) have become a very good entertainment platform, and consumers spend more and more time on portable devices, for example, playing games and watching videos on portable devices.

The field of view (FOV) of a human eye vision system is about 180 degrees in a horizontal direction and about 135 degrees in a vertical direction. Generally speaking, larger coverage of display content in the FOV of a user brings the user a better immersive image viewing experience. Generally, the size of a display screen of the portable device is restricted by its portability, and therefore, the portable device can only cover a small part of the FOV of a user when being placed at a natural viewing position of the user, and it is difficult to provide an immersive image viewing experience. In addition, high-quality image content having an attribute such as high resolution and a large FOV cannot be adapted to a display screen of a portable device having a small FOV and low resolution, which affects a viewing experience of a user.

SUMMARY

An example, non-limiting objective of the present application is to provide a display control solution.

To these and/or related ends, in a first example aspect, an embodiment of the present application provides a display control method, where the method comprises:

determining a first display area, of an image displayed on a main display device, in the FOV of a user;

dividing the image according to display capabilities of the main display device and at least one near-to-eye display device, the first display area, and an attribute of the image; and controlling a display of the at least one near-to-eye display device in accordance with a result of the division of the image.

In a second example aspect, an embodiment of the present application provides a display control apparatus, where the apparatus comprises:

a display area determining module, configured to determine a first display area, of an image displayed on a main display device, in the FOV of a user;

a dividing module, configured to divide the image according to display capabilities of the main display device and at least one near-to-eye display device, the first display area, and an attribute of the image; and a display control module, configured to control a display of the at least one near-to-eye display device in accordance with a result of the division of the image.

In a third example aspect, an embodiment of the present application provides a near-to-eye display device, which comprises the display control apparatus described in the forgoing implementation manner.

In a fourth example aspect, an embodiment of the present application provides a computer readable storage device, comprising at least one executable instruction, which, in response to execution, causes a system comprising a processor to perform operations, comprising:

determining a first display area, of an image displayed on a main display device, in the field of view (FOV) of a user;

dividing the image according to display capabilities of the main display device and at least one near-to-eye display device, the first display area, and an attribute of the image; and controlling a display of the at least one near-to-eye display device in accordance with a result of the division of the image.

In a fifth example aspect, an embodiment of the present application provides a device for display control, comprising a processor and a memory, wherein the memory storing a computer executable instruction, the processor being connected with the memory via a communication bus, and when the device is operating, the processor executes or facilitates execution of the executable instructions stored by the memory to cause the device to perform operations, comprising:

determining a first display area, of an image displayed on a main display device, in the field of view (FOV) of a user;

dividing the image according to display capabilities of the main display device and at least one near-to-eye display device, the first display area, and an attribute of the image; and controlling a display of the at least one near-to-eye display device in accordance with a result of the division of the image.

In one or more of the embodiments of the present application, at least one near-to-eye display device is used to supplement a display that is provided at a suitable viewing distance of a user by a device but cannot fully fill the FOV of the user, so that an image can be displayed by making adaptations to meet the original quality of the image as far as possible, thereby providing a good viewing experience.

DETAILED DESCRIPTION

Embodiments of the present application are further described in detail hereinafter with reference to the accompanying drawings (identical reference numbers in the several accompanying drawings indicate identical elements) and embodiments. The following embodiments are intended to describe the present application, but not to limit the scope of the present application.

A person skilled in the art may understand that terminologies such as "first" and "second" in the present application are merely used for distinguishing different steps, devices, modules, or the like, which neither represent any specific technical meaning, nor indicate any necessary logical order between steps, devices, modules, or the like.

The method and apparatus of the embodiments of the present application are configured to provide a good viewing experience for a user who uses a device with a display function to view an image (such as a text, a pattern, a video, or a game). Such a device in the embodiments of the present application is referred to as a "main display device", which is an initial device for viewing an image, and generally refers to a device, a display provided by which at a suitable viewing distance of a user cannot fully fill the FOV of the user. Such a device is not limited to a portable device with a limited display screen size, for example, a mobile phone or a tablet computer, and may also comprise any other device having a relatively limited display capability as compared with image quality, for example, a desktop computer or a television.

Figure 1:
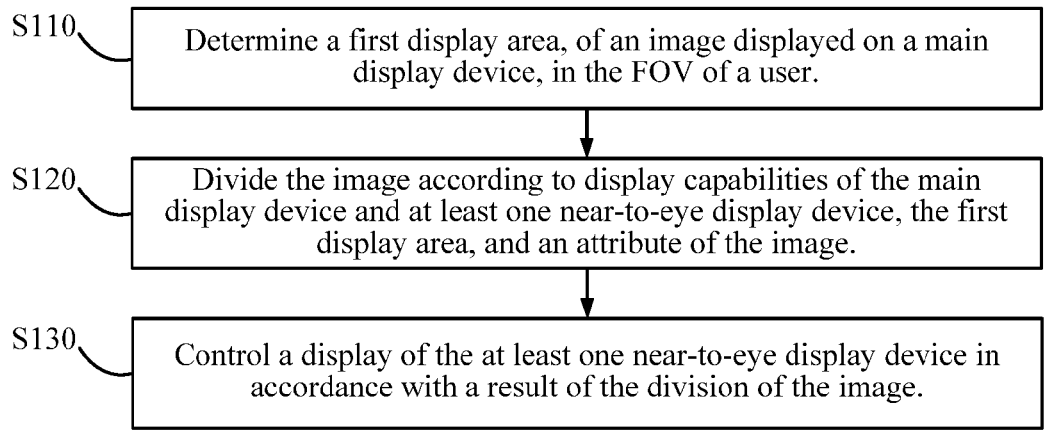
FIG. 1 is an example flowchart of a display control method according to an embodiment of the present application.

As shown in FIG. 1, a display control method of an embodiment of the present application comprises:

S110. Determine a first display area, of an image displayed on a main display device, in the FOV of a user.

Figure 2:
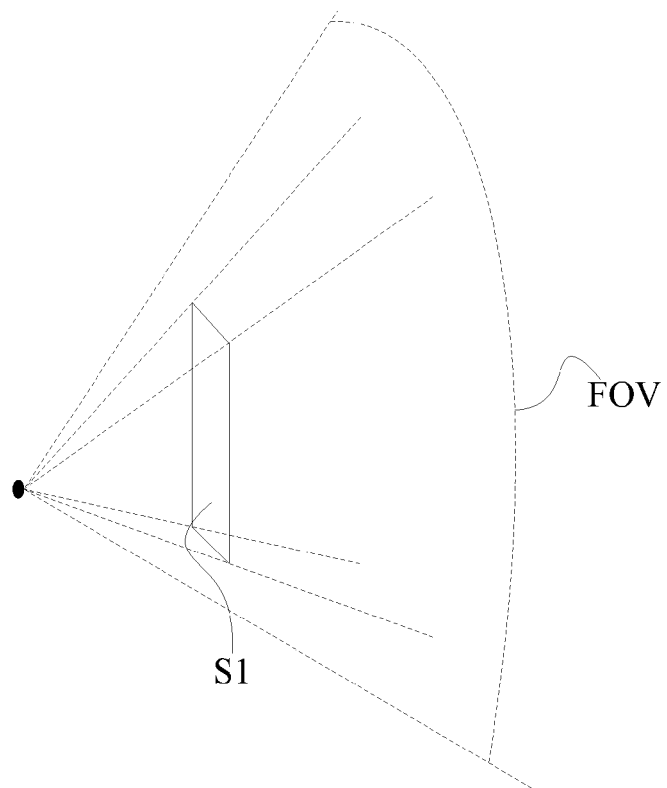
FIG. 2 is an example schematic diagram of the FOV of a user, which is corresponding to a display of a main display device, in a display control method according to an embodiment of the present application.

The FOV of a human eye vision system is about 180 degrees in a horizontal direction and about 135 degrees in a vertical direction. At a viewing distance where it is comfortable to view an image, a display of the main display device can hardly fill the whole FOV of the user. As shown in FIG. 2, the image displayed on the main display device fills the first display area d1 of the FOV of the user, and except the first display area S1, there is still a large unfilled region in the FOV of the user. In the method of this embodiment of the present application, the first display area S1 can be determined by various ways, for example, the first display area S1 is determined by detecting relative positions of the main display device and eyes of the user and with reference to the size of the main display device; or an image presented on the fundus of the user is collected, or the image on the main display device is collected by using a near-to-eye display device, and the first display area S1 is then determined by using an image processing and analysis method.

S120. Divide the image according to display capabilities of the main display device and at least one near-to-eye display device, the first display area, and an attribute of the image.

The near-to-eye display device is a device capable of presenting, at a position close to eyes of a user, an image provided by an image source. Such a near-to-eye display device is also referred to as a head mounted display (HMD), such as intelligent glasses, a helmet, or goggles. Certainly, the near-to-eye display device is not limited to a head-mounted device and also comprises a device in another possible portable form such as an onboard form or a wearing form. The near-to-eye display device is capable of presenting a virtual image of the image at a near-to-eye position in a penetration manner. The position of the virtual image which is presented in a penetration manner by the near-to-eye display device is controlled, so that final imaging information on the retina of the user not only comprises the image presented by the near-to-eye display device but also comprises an image presented in a remaining area of the FOV of the user, such as a background image or an image displayed by another display device. The near-to-eye display device has a relatively large visible region, has relatively low costs and power consumption, and is relatively light and small.

The attribute of the image may comprise resolution and/or an aspect ratio, and the display capability of the display device may also comprise resolution and/or an aspect ratio. In the method of this embodiment of the present application, in order to provide a good viewing experience, a high-quality image having an attribute such as high resolution and/or a large aspect ratio is divided according to the display capabilities of the main display device and the at least one near-to-eye display device, and is separately displayed by the main display device and the at least one near-to-eye display device in a coordinating manner, so that the FOV of the user is filled as full as possible, and adaptations are made by using a coordinated display capability that is close to original quality of the image as far as possible, so as to meet the original quality of the image.

Figure 3A:
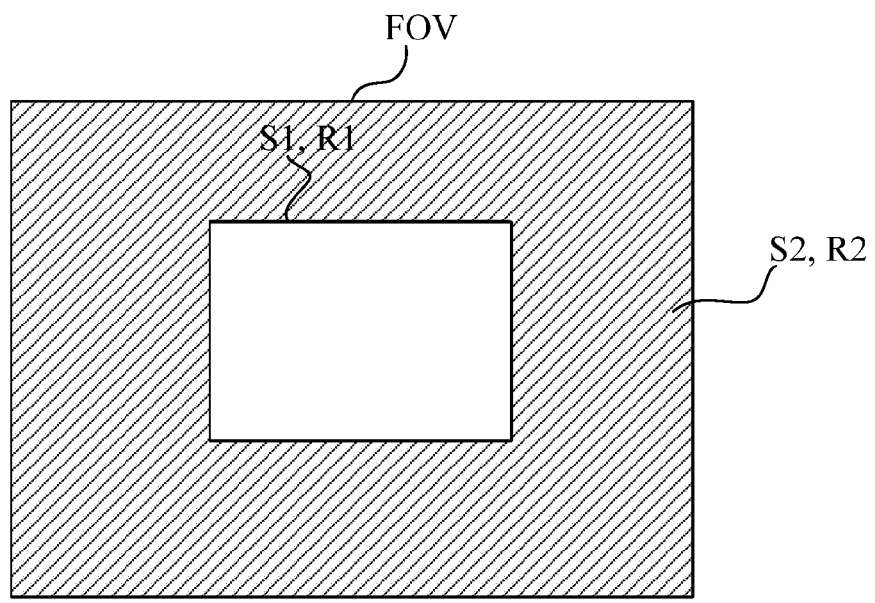
FIG. 3(a) to FIG. 3 (b) are corresponding example schematic diagrams of the corresponding FOV of a user when a main display device and a near-to-eye display device perform coordinated display in a display control method according to an embodiment of the present application.

For example, the main display device is not adapted to the resolution of the image: as shown in FIG. 3(a), the main display device has first resolution R1, the first display area is S1, maximum resolution of a binocular near-to-eye display device (not limited thereto) is second resolution R2, the resolution of the image is third resolution R3, and the first resolution R1 is lower than the third resolution R3. In accordance with the method of this embodiment of the present application, in order to display the image with resolution close to the third resolution R3 as far as possible, the near-to-eye display device is used to coordinate with a display of the main display device. The image is divided to achieve the aim that the resolution of the coordinated display is close to the third resolution R3 as far as possible on the premise that the coordinated display is not beyond the display capabilities of the display devices, and display content is allocated to the main display device and the near-to-eye display device. Specifically, a second display area S2 (indicated by slanted lines), of the near-to-eye display device, in the FOV of the user is determined according to the first display area S1; a display area jointly defined by the first display area S1 and the second display area S2 does not exceed the FOV of the user; and on the premise that display resolution of the main display device and the near-to-eye display device does not exceed a lower one of the first resolution R1 and the second resolution R2, resolution of the coordinated display of the main display device and the near-to-eye display device is close to the third resolution R3 as far as possible or exceeds the third resolution R3 in an overall display area of the first display area S1 and the second display area S2. Processing such as up-sampling and down-sampling is performed on the image according to the resolution of the coordinated display and the third resolution R3, the image is divided in accordance with a corresponding relationship of the processed image with the first display area and the second display area, and pixels of the image are mapped to the display devices.

Figure 3B:
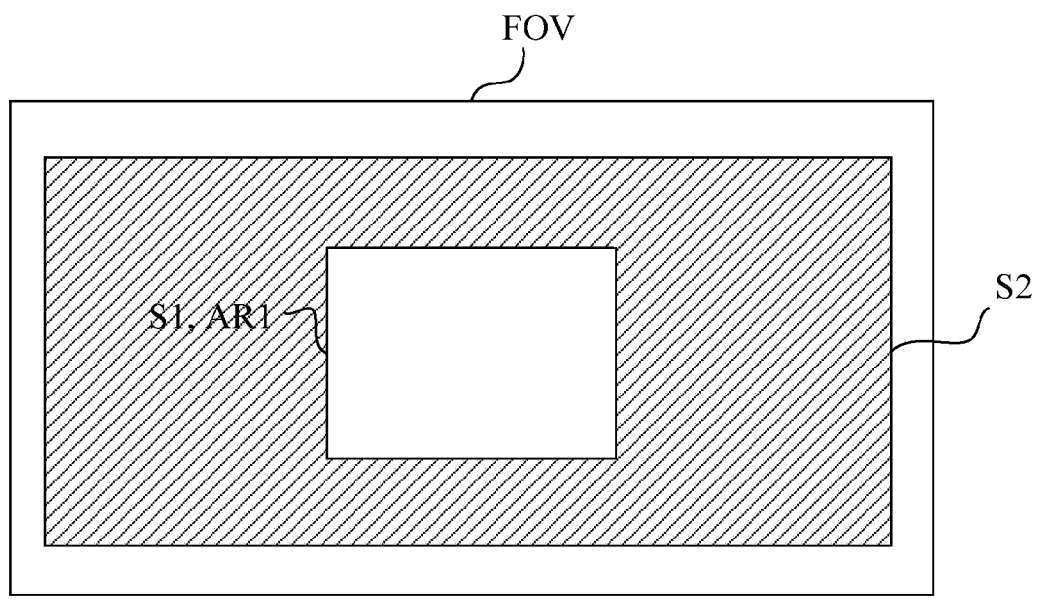

For example, the aspect ratio of the main display device is not adapted to the aspect ratio of the image: as shown in FIG. 3(b), the main display device has a first aspect ratio AR 1, the first display area is S1, the aspect ratio of the image is a second aspect ratio AR 2 (when the image is a panorama image, the second aspect ratio AR 2 is relatively large), and the first aspect ratio AR 1 is less than the second aspect ratio AR 2. In accordance with the method of this embodiment of the present application, in order to display the image with an aspect ratio close to the second aspect ratio AR 2 as far as possible, a binocular near-to-eye display device is used to coordinate with a display of the main display device. The image is divided to achieve the aim of making an aspect ratio of the coordinated display close to the second aspect ratio AR 2 as far as possible on the premise that the coordinated display is not beyond the display capabilities of the display devices, and display content is allocated to the main display device and the near-to-eye display device. Specifically, a second display area S2 (indicated by slanted lines), of the near-to-eye display device, in the FOV of the user is determined according to the first display area S1; a display area jointly defined by the first display area S1 and the second display area S2 does not exceed the FOV of the user; and an aspect ratio of an overall display area of the main display device and the near-to-eye display device is made close to the second aspect ratio AR 2 as far as possible. Processing such as zooming, up-sampling, and down-sampling is performed on the image according to the aspect ratio of the coordinated display and the second aspect ratio AR 2, the image is divided in accordance with a corresponding relationship of the processed image with the first display area and the second display area, and pixels of the image are mapped to the display devices. An image division principle also needs to ensure that display brightness of display content transitions smoothly on display edges of different display devices by means of the processing. The image division method is not limited thereto.

In the method of this embodiment of the present application, the at least one near-to-eye display device may comprise one or more near-to-eye display devices, and the near-to-eye display device may be a monocular or binocular near-to-eye display device. In addition, the monocular near-to-eye display device may have multiple resolution values.

S130. Control a display of the at least one near-to-eye display device in accordance with a result of the division of the image. In accordance with the result of the division of the image, the main display device displays a part of the image, and the at least one near-to-eye display device displays the rest of the image, so that the image is displayed by making adaptations to meet the original quality of the image as far as possible.

In summary, in the method of this embodiment of the present application, at least one near-to-eye display device is used to supplement a display that is provided at a suitable viewing distance of a user by a device but cannot fully fill the FOV of the user, so as to display an image by making adaptations to meet original quality of the image as far as possible, thereby providing a good viewing experience.

Step S120 may further comprise:

S121. Determine a second display area, of the at least one near-to-eye display device, in the FOV of the user according to the first display area.

Given that a size-limited display screen of the main display device can only fill a part of the FOV, in order to make full use of the FOV of the user to get close to the original quality of the image, as shown in FIG. 3(a), the second display area S2 comprises a region in the FOV of the user except the first display area S1.

S122. Divide the image according to the display capabilities of the main display device and the at least one near-to-eye display device, the first display area, the second display area, and the attribute of the image.

In step S130, the pixels of the image can be dynamically mapped to the corresponding display devices in accordance with the forgoing division result.

It should be noted that, in order to ensure a viewing effect, the spatial position of the display of the at least one near-to-eye display device needs to be associated with the spatial position of the content displayed by the main display device. When the user rotates or moves the main display device, the first display area changes, and the second display area of the at least one near-to-eye display device changes accordingly.

Using the method of this embodiment of the present application, a user sees a combination of a real image displayed by the main display device and a virtual image displayed by the at least one near-to-eye display device. In order to prevent the display of the at least one near-to-eye display device from disturbing the user when the user views the display on the main display device, and achieve an effect of supplementing and even improving the viewing experience, the virtual image displayed by the at least one near-to-eye display device should be presented as natural as possible. Therefore, in order to ensure the viewing effect, the method of this embodiment of the present application further comprises:

S140. Adjust a display parameter of the at least one near-to-eye display device to optimize an overall display effect.

The display parameter of the at least one near-to-eye display device can be adjusted according to a position relationship between the main display device and the eyes of the user. For example, the virtual image displayed by the at least one near-to-eye display device is presented in a same plane as the display of the main display device. In this case, the display parameter of the at least one near-to-eye display device should be adjusted according to a distance between the main display device and the eyes of the user.

The display parameter of the least one near-to-eye display device can also be adjusted according to a display characteristic of the main display device.

The display characteristic may comprise: curvature of the display screen of the main display device. For example, when the main display device has a curved display screen, the display parameter of the at least one near-to-eye display device should be correspondingly adjusted, so that the display of the at least one near-to-eye display device can transition naturally and smoothly in a curved manner to the display of the main display device.

The display characteristic may further comprise: the resolution of the main display device. In order to display the forgoing image with full details, the resolution of the at least one near-to-eye display device should be the same as that of the main display device, but is not limited thereto. The resolution of the at least one near-to-eye display device may also be lower than the resolution of the main display device.

Because content of the image is jointly presented by at least two display devices, correction of display attributes (brightness, contrast, and color, and so on) needs to be completed between multiple display devices. The display characteristic may further comprise a display attribute of the main display device, comprising brightness, contrast, color, and the like, so that the display of the near-to-eye display device can be adjusted according to a relevant correction parameter, and the joint display of the multiple display devices does not cause any subjective distortion in a final presenting effect of the image content.

It can be understood by a person skilled in the art that, in the foregoing method of the embodiments of the present application, sequence numbers of the steps do not mean execution order, and the execution order of the steps should be determined by functions and internal logic of the steps, and should not constitute any limit to an implementation process of the embodiments of the present application.

Figure 4:
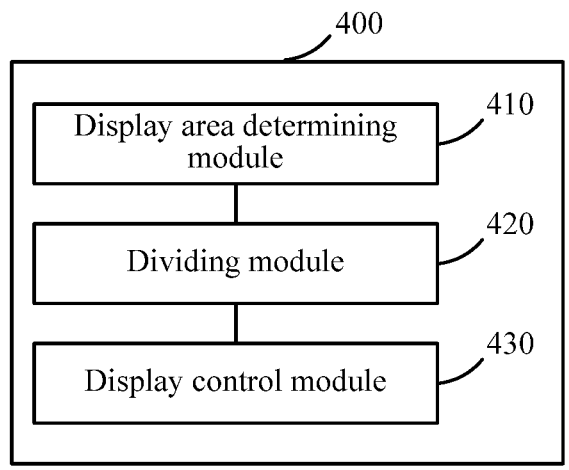
FIG. 4 is an example schematic structural diagram of a display control apparatus according to an embodiment of the present application.

An embodiment of the present application further provides a display control apparatus. The apparatus is configured to provide a good viewing experience for a user who uses a device with a display function to view an image (such as a text, a pattern, a video, or a game). The apparatus may be a main display device or a near-to-eye display device, may also be a part of the near-to-eye display device, and even may be a third-party device independent of any one of the main display device and the near-to-eye display device. In order to implement the solution of this embodiment of the present application, in all cases, the apparatus may comprise a communications module, configured to communicate with the main display device or the near-to-eye display device to obtain or send information which is necessary for each module to complete their own functions. As shown in FIG. 4, a display control apparatus 400 of this embodiment of the present application comprises:

a display area determining module 410, configured to determine a first display area, of an image displayed on a main display device, in the FOV of a user;

The FOV of a human eye vision system is about 180 degrees in a horizontal direction and about 135 degrees in a vertical direction. Because the size of a display screen of the main display device is generally small, at a viewing distance where it is comfortable to view an image, a display of the main display device can hardly fill the whole FOV of the user. As shown in FIG. 2, the image displayed on the main display device fills the first display area S1 of the FOV of the user, and except the first display area S1, there is still a large unfilled region in the FOV of the user. In the apparatus according to this embodiment of the present application, the display area determining module 410 can determine the first display area S1 by various ways, for example, determining the first display area S1 by detecting relative positions of the main display device and eyes of the user and with reference to the size of the main display device, or determining the first display area S1 by collecting an image presented on the fundus of the user or collecting, by using a near-to-eye display device, the image on the main display device, and then using an image processing and analysis method.

a dividing module 420, configured to divide the image according to display capabilities of the main display device and at least one near-to-eye display device, the first display area, and an attribute of the image.

The near-to-eye display device is a device capable of presenting, at a position close to eyes of a user, an image provided by an image source. Such a near-to-eye display device is also referred to as an HMD, such as intelligent glasses, a helmet, or goggles. Certainly, the near-to-eye display device is not limited to a head-mounted device and also comprises a device in another possible portable form such as an onboard form or a wearing form. The near-to-eye display device is capable of presenting a virtual image of the image at a near-to-eye position in a penetration manner. The position of the virtual image which is presented in a penetration manner by the near-to-eye display device is controlled, so that final imaging information on the retina of the user not only comprises the image presented by the near-to-eye display device but also comprises an image presented in a remaining area of the FOV of the user, such as a background image or an image displayed by another display device. The near-to-eye display device has a relative large visible region, has relatively low costs and power consumption, and is relatively light and small.

The attribute of the image may comprise resolution and/or an aspect ratio, and the display capability of the display device may also comprise resolution and/or an aspect ratio. In the apparatus of this embodiment of the present application, in order to provide a good viewing experience, a high-quality image having an attribute such as high resolution and/or a large aspect ratio is divided according to the display capabilities of the main display device and the at least one near-to-eye display device, and is separately displayed by the main display device and the at least one near-to-eye display device in a coordinating manner, so that the FOV of the user is filled as full as possible, and adaptations are made by using a coordinated display capability that is close to original quality of the image as far as possible, so as to meet the original quality of the image.

For example, the main display device is not adapted to the resolution of the image: as shown in FIG. 3(a), the main display device has first resolution R1, the first display area is S1, maximum resolution of a binocular near-to-eye display device (not limited thereto) is second resolution R2, the resolution of the image is third resolution R3, and the first resolution R1 is lower than the third resolution R3. In accordance with the apparatus of this embodiment of the present application, in order to display the image with resolution close to the third resolution R3 as far as possible, the near-to-eye display device is used to coordinate with a display of the main display device. The image is divided to achieve the aim that the resolution of the coordinated display is close to the third resolution R3 as far as possible on the premise that the coordinated display is not beyond the display capabilities of the display devices, and display content is allocated to the main display device and the near-to-eye display device. Specifically, a second display area S2 (indicated by slanted lines), of the near-to-eye display device, in the FOV of the user is determined according to the first display area S1; a display area jointly defined by the first display area S1 and the second display area S2 does not exceed the FOV of the user; and on the premise that display resolution of the main display device and display resolution of the near-to-eye display device does not exceed a lower one of the first resolution R1 and the second resolution R2, resolution of the coordinated display of the main display device and the near-to-eye display device is close to the third resolution R3 as far as possible or exceeds the third resolution R3 in an overall display area of the first display area S1 and the second display area S2. Processing such as up-sampling and down-sampling is performed on the image according to the resolution of the coordinated display and the third resolution R3, the image is divided in accordance with a corresponding relationship of the processed image with the first display area and the second display area, and pixels of the image are mapped to the display devices.

For example, the aspect ratio of the main display device is not adapted to the aspect ratio of the image: as shown in FIG. 3(b), the main display device has a first aspect ratio AR 1, the first display area is S1, the aspect ratio of the image is a second aspect ratio AR 2 (when the image is a panorama image, the second aspect ratio AR 2 is relatively large), and the first aspect ratio AR 1 is less than the second aspect ratio AR 2. When the apparatus of this embodiment of the present application is used, in order to display the image with an aspect ratio close to the second aspect ratio AR 2 as far as possible, a binocular near-to-eye display device is used to coordinate with a display of the main display device. The image is divided to achieve the aim of making an aspect ratio of the coordinated display close to the second aspect ratio AR 2 as far as possible on the premise that the coordinated display is not beyond the display capabilities of the display devices, and display content is allocated to the main display device and the near-to-eye display device. Specifically, a second display area S2 (indicated by slanted lines), of the near-to-eye display device, in the FOV of the user is determined according to the first display area S1; a display area jointly defined by the first display area S1 and the second display area S2 does not exceed the FOV of the user; and an aspect ratio of an overall display area of the main display device and the near-to-eye display device is made close to the second aspect ratio AR 2 as far as possible. Processing such as zooming, up-sampling, and down-sampling is performed on the image according to the aspect ratio of the coordinated display and the second aspect ratio AR 2, the image is divided in accordance with a corresponding relationship of the processed image with the first display area and the second display area, and pixels of the image are mapped to the display devices. An image division principle also needs to ensure that display brightness of the display content transitions smoothly on display edges of different display devices by means of the processing. The image division method is not limited thereto.

In the apparatus of this embodiment of the present application, the at least one near-to-eye display device may comprise one or more near-to-eye display devices, and the near-to-eye display device may be a monocular or binocular near-to-eye display device. In addition, the monocular near-to-eye display device may further have multiple resolution values.

a display control module 430, configured to control a display of the at least one near-to-eye display device in accordance with the division. In accordance with a result of the division of the image, the main display device displays a part of the image, and the at least one near-to-eye display device displays the rest of the image, so that the image is displayed by making adaptations to meet the original quality of the image as far as possible.

In summary, in the apparatus of this embodiment of the present application, at least one near-to-eye display device is used to supplement a display that is provided at a suitable viewing distance of a user by a device but cannot fully fill the FOV of the user, so that an image can be displayed by making adaptations to meet the original quality of the image as far as possible, thereby providing a good viewing experience.

Figure 5:
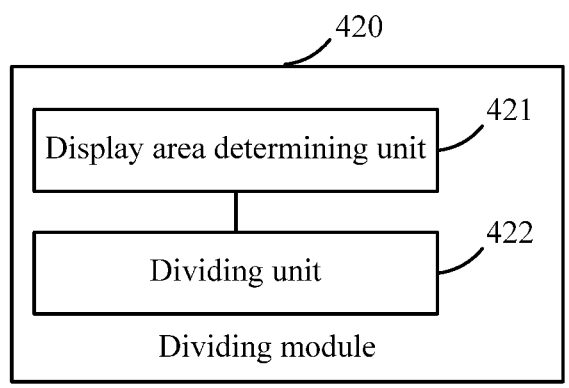
FIG. 5 is an example schematic structural diagram of a display control module in a display control apparatus according to an embodiment of the present application.

As shown in FIG. 5, the division module 420 comprises:

a display area determining unit 421, configured to determine a second display area, of the at least one near-to-eye display device, in the FOV of the user according to the first display area; and Given that a size-limited display screen of the main display device can only fill a part of the FOV, in order to make full use of the FOV of the user to get close to the original quality of the image, as shown in FIG. 3a), the second display area S2 comprises a region in the FOV of the user except the first display area S1.

a dividing unit 422, configured to divide the image according to the display capabilities of the main display device and the at least one near-to-eye display device, the first display area, the second display area, and the attribute of the image.

The display control module 430 is capable of dynamically mapping the pixels of the image to the corresponding display devices in accordance with the result of the division of the image.

It should be noted that, in order to ensure a viewing effect, the spatial position of the display of the at least one near-to-eye display device needs to be associated with the spatial position of the content displayed by the main display device. When the user rotates or moves the main display device, the first display area changes, and the second display area of the at least one near-to-eye display device changes accordingly.

Figure 6:
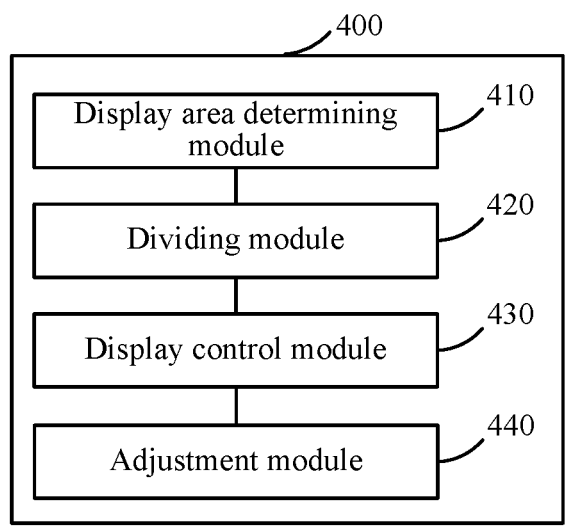
FIG. 6 is an example schematic structural diagram of another display control apparatus according to an embodiment of the present application.

Using the apparatus of this embodiment of the present application, a user sees a combination of a real image displayed by the main display device and a virtual image displayed by the at least one near-to-eye display device. In order to prevent the display of the at least one near-to-eye display device from disturbing the user when the user views the display on the main display device, and achieve an effect of supplementing and even improving the viewing experience, the virtual image displayed by the at least one near-to-eye display device should be presented as natural as possible. Therefore, in order to ensure the viewing effect, as shown in FIG. 6, the apparatus further comprises:

an adjustment module 440, configured to adjust a display parameter of the at least one near-to-eye display device to optimize an overall display effect.

The adjustment module 440 is capable of adjusting the display parameter of the at least one near-to-eye display device according to a position relationship between the main display device and the eyes of the user. For example, the virtual image displayed by the at least one near-to-eye display device is presented in a same plane as the display of the main display device. In this case, the display parameter of the at least one near-to-eye display device should be adjusted according to a distance between the main display device and the eyes of the user.

The adjustment module 440 is also capable of adjusting the display parameter of the least one near-to-eye display device according to a display characteristic of the main display device.

The display characteristic may comprise: curvature of the display screen of the main display device. For example, when the main display device has a curved display screen, the adjustment module 440 should correspondingly adjust the display parameter of the at least one near-to-eye display device, so that the display of the at least one near-to-eye display device can transition naturally and smoothly in a curved manner to the display of the main display device.

The display characteristic may further comprise: the resolution of the main display device. In order to display the forgoing image with full details, the resolution of the at least one near-to-eye display device should be the same as that of the main display device, but is not limited thereto. The resolution of the at least one near-to-eye display device may also be lower than the resolution of the main display device.

Because content of the image is jointly presented by at least two display devices, correction of display attributes (brightness, contrast, and color, and so on) needs to be completed between multiple display devices. The display characteristic may further comprise a display attribute of the main display device, comprising brightness, contrast, color, and the like, so that the display of the near-to-eye display device can be adjusted according to a relevant correction parameter, and the joint display of the multiple display devices does not cause any subjective distortion in a final presenting effect of the image content.

Figure 7:
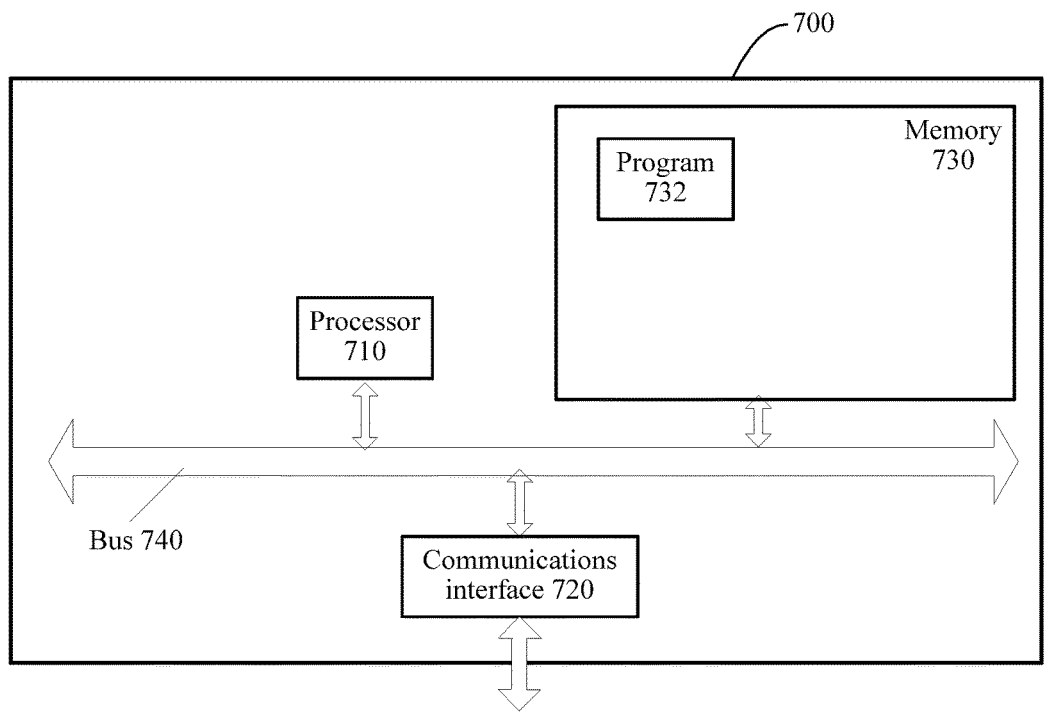
FIG. 7 is an example schematic structural diagram of still another display control apparatus according to an embodiment of the present application.

FIG. 7 is schematic structural diagram of a display control apparatus 700 according to an embodiment of the present application. Specific embodiments of the present application do not limit the example implementation of the display control apparatus 700. As shown in FIG. 7, the display control device 700 may comprise:

a processor 710, a communications interface 720, a memory 730, and a communications bus 740, where:

the processor 710, the communications interface 720, and the memory 730 communicate with each other by using the communications bus 740.

The communications interface 720 is configured to communicate with a network element such as a client.

The processor 710 is configured to execute a program 732. Specifically, the processor 710 can perform relevant steps in the forgoing method embodiment.

Specifically, the program 732 may comprise program code, where the program code comprises a computer operation instruction.

The processor 710 may be a central processing unit (CPU), an application specific integrated circuit (ASIC), or one or more integrated circuits configured to implement this embodiment of the present application.

The memory 730 is configured to store the program 732. The memory 730 may comprise a high-speed random access memory (RAM), and may also comprise a non-volatile memory such as at least one disk memory. The program 732 may be specifically configured to enable the display control device 700 to perform the following steps:

determining a first display area, of an image displayed on a main display device, in the FOV of a user;

dividing the image according to display capabilities of the main display device and at least one near-to-eye display device, the first display area, and an attribute of the image; and controlling a display of the at least one near-to-eye display device in accordance with the division.

For the example implementation of the steps in the program 732, reference may be made to corresponding descriptions of the corresponding steps and units in the forgoing embodiments, and details are not described herein again. It can be clearly understood by a person skilled in the art that, to make the description convenient and concise, for a detailed working process of the foregoing devices and modules, reference may be made to the corresponding process description in the foregoing method embodiment, and details are not described herein again.

Figure 8:
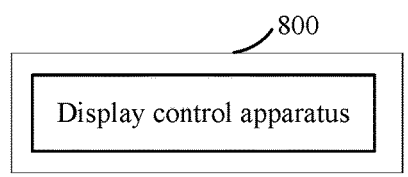
FIG. 8 is an example schematic structural diagram of a near-to-eye display device according to an embodiment of the present application.

As shown in FIG. 8, an embodiment of the present application further provides a near-to-eye display device 800, which comprises the display control apparatuses described in the embodiments of FIG. 4 to FIG. 7.

In this embodiment of the present application, the near-to-eye display device may be, for example, intelligent glasses, a helmet, or goggles.

A person of ordinary skill in the art may realize that, in combination with the examples described in the embodiments disclosed in this specification, units and method steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that such implementation goes beyond the scope of the present application.

When the function is implemented in the form of a software functional unit and sold or used as an independent product, it may be stored in a computer-readable storage medium. Based on such an understanding, the technical solutions of the present application essentially, or the part contributing to the prior art, or all or a part of the technical solutions may be implemented in the form of a software product. The software product is stored in a storage medium and comprises several instructions for instructing a computer device (which may be a personal computer, a server, a network device, or the like) or a processor to perform all or a part of the steps of the methods in the embodiments of the present application. The foregoing storage medium comprises: any medium that can store program code, such as a USB flash drive, a removable hard disk, a read-only memory (ROM), a RAM, a magnetic disk, or an optical disc.

The above embodiments are only used to describe the present application, rather than limiting the present application; various alterations and modifications can be made by those of ordinary skill in the art without departing from the spirit and scope of the present application. Therefore, all equivalent technical solutions also belong to the scope of the present application, and the patent protection scope of the present application should be subject to the claims.

What is claimed is:

1. A method, comprising:
   determining, by a device comprising a processor, a first display area, of an image displayed on a main display device, in a field of view (FOV) of a user;
   determining, by the device, a second display area, of the at least one near-to-eye display device, in the FOV of the user according to the first display area;
   dividing, by the device, the image according to display capabilities of the main display device and at least one near-to-eye display device, the first display area, the second display area, and an attribute of the image; and
   controlling, by the device, a display of the at least one near-to-eye display device in accordance with a result of the dividing of the image, wherein the main display device displays a part of the image and the at least one near-to-eye display device displays the rest of the image.

2. The method of claim 1, wherein the attribute of the image comprises:
   resolution and/or an aspect ratio of the image.

3. The method of claim 1, wherein the second display area comprises: a region in the FOV of the user except the first display area.

4. The method of claim 1, further comprising:
adjusting, by the device, a display parameter of the at least one near-to-eye display device.

5. The method of claim 4, wherein the adjusting the display parameter comprises:
adjusting the display parameter of the at least one near-to-eye display device according to a position relationship between the main display device and eyes of the user.

6. The method of claim 4, wherein the adjusting the display parameter comprises:
adjusting the display parameter of the at least one near-to-eye display device according to a display characteristic of the main display device.

7. The method of claim 6, wherein the display characteristic comprises: a curvature of a display screen of the main display device.

8. The method of claim 6, wherein the display characteristic comprises at least one of a resolution, a brightness, a contrast, or a color of the main display device.

9. An apparatus, comprising:
a processor, coupled to a memory, that executes or facilitates execution of executable modules, comprising:
a display area determining module configured to determine a first display area, of an image displayed on a main display device, in a field of view (FOV) of a user;
a dividing module configured to:
determine a second display area, of the at least one near-to-eye display device, in the FOV of the user according to the first display area,
divide the image according to display capabilities of the main display device and at least one near-to-eye display device, the first display area, the second display area, and an attribute of the image; and
a display control module configured to control a display of the at least one near-to-eye display device in accordance with a result of the dividing of the image, such that the main display device displays a part of the image and the at least one near-to-eye display device displays the rest of the image.

10. The apparatus of claim 9, wherein the executable modules further comprise:
an adjustment module configured to adjust a display parameter of the at least one near-to-eye display device.

11. The apparatus of claim 10, wherein the adjustment module adjusts the display parameter of the at least one near-to-eye display device according to a position relationship between the main display device and eyes of the user.

12. The apparatus of claim 10, wherein the adjustment module adjusts the display parameter of the at least one near-to-eye display device according to a display characteristic of the main display device.

13. A near-to-eye display device, comprising the apparatus of claim 9.

14. A non-transitory computer readable medium, comprising at least one executable instruction, which, in response to execution, causes a system comprising a processor to perform operations, comprising:
determining a first display area, of an image displayed on a main display device, in a field of view (FOV) of a user;
determining a second display area, of the at least one near-to-eye display device, in the FOV of the user according to the first display area;
dividing the image according to display capabilities of the main display device and at least one near-to-eye display device, the first display area, the second display area, and an attribute of the image; and
controlling a display of the at least one near-to-eye display device in accordance with a result of the dividing of the image, wherein the main display device displays a part of the image and the at least one near-to-eye display device displays the rest of the image.

15. A device for display control, comprising a processor and a memory, wherein the memory stores executable instructions, the processor being connected with the memory via a communication bus, and when the device is operating, the processor executes or facilitates execution of the executable instructions stored by the memory to cause the device to perform operations, comprising:
determining a first display area, of an image displayed on a main display device, in a field of view (FOV) of a user;
determining a second display area, of the at least one near-to-eye display device, in the FOV of the user according to the first display area;
dividing the image according to display capabilities of the main display device and at least one near-to-eye display device, the first display area, the second display area, and an attribute of the image; and
controlling a display of the at least one near-to-eye display device in accordance with a result of the dividing of the image, such that the main display device displays a part of the image and the at least one near-to-eye display device displays the rest of the image.

16. The device of claim 15, wherein the dividing the image comprises:
determining a second display area, of the at least one near-to-eye display device, in the FOV of the user according to the first display area; and
dividing the image according to the display capabilities of the main display device and the at least one near-to-eye display device, the first display area, the second display area, and the attribute of the image.

17. The device of claim 15, wherein the attribute of the image comprises: resolution and/or an aspect ratio of the image.

18. The device of claim 15, wherein the second display area comprises: a region in the FOV of the user except the first display area.

19. The device of claim 15, the operations further comprising:
adjusting, by the device, a display parameter of the at least one near-to-eye display device.

20. The device of claim 19, wherein the adjusting the display parameter comprises:
adjusting the display parameter of the at least one near-to-eye display device according to a position relationship between the main display device and eyes of the user.

* * * * *